Feb. 16, 1937. J. D. PRICE 2,070,620
GAS PURIFICATION PROCESS
Filed Dec. 9, 1933 4 Sheets-Sheet 1

COKE OVEN GAS →

REGENERATED AQUEOUS
AMMONIACAL SOLUTION →

FOULED AQUEOUS
AMMONIACAL SOLUTION →

AIR ✕ →

FOULED AIR TO
COMBUSTION ○→

INVENTOR.
John D. Price,
BY Henry & Ella &&
ATTORNEY.

Patented Feb. 16, 1937

2,070,620

UNITED STATES PATENT OFFICE 2,070,620

GAS PURIFICATION PROCESS

John D. Price, Montreal, Quebec, Canada, assignor, by mesne assignments, to Koppers Company, a corporation of Delaware Application December 9, 1933, Serial No. 701,643

1 Claim. (Cl. 23—3)

The invention relates to the purification of gas and relates more particularly to a method and apparatus for the removal and disposal of ammonia with simultaneous removal of hydrogen sulphide from fuel gas.

The invention has for its objects to provide certain new and useful improvements in methods and apparatus of the character described. It has been the practice in those gas making plants which found it desirable to discard rather than to recover ammonia, to absorb the same in water and to discard as waste the resultant ammonia liquor which also contains a certain amount of hydrogen sulphide. The efficient disposal of this effluent liquor has presented several problems, particularly in locations where river conditions are unfavorable, and the obnoxious nature of the effluent renders is detrimental to animal and vegetable life. Also, the absorbing of the ammonia with water, as above mentioned, failed to remove efficiently the hydrogen sulphide of the gas and in fact removed only about 35% of it and so was ineffective gas purification.

An important object of the present invention is the provision of an improved method of ammonia removal and disposal together with a simultaneous removal of hydrogen sulphide from the gas, which method is more efficient than has obtained in prior practice. Under certain circumstances it may be desirable and beneficial that a small amount of ammonia be left in the gas after treatment according to the present invention and which residual ammonia and its properties are utilized in the further purification of the gas, for example in the oxide boxes. Such further treatment in the oxide boxes does not constitute a part of this invention but the instant invention does contemplate the retention of small quantities of ammonia in the gas from which the hydrogen sulphide and most of the ammonia has been removed, for the beneficial results afterwards imparted thereby to the gas in the oxide boxes.

The invention is particularly applicable to coke oven gas which has passed through a primary cooler or scrubber and from which the heavier constituents, such as tar have been removed.

According to the present invention the relatively cool gas, such as coke oven gas, containing ammonia, is scrubbed with an aqueous liquid and the resultant ammonia liquor is treated in another scrubber by air or inert gas to effect removal of the hydrogen sulphide and ammonia, the aerated and regenerated solution then being returned to the gas scrubber. The solution is thus recirculated continuously between the ammonia and hydrogen sulphide absorber and the ammonia and hydrogen sulphide removal scrubber, in a closed cycle.

An important object of the present invention is to utilize the appreciable concentration of ammonia remaining in the aerated solution, for the purpose of more efficiently absorbing and removing the hydrogen sulphide from the gas.

According to the invention as high as 60 to 75% or more of the hydrogen sulphide may be removed, with simultaneous removal of most of the ammonia from the gas. There is thus a preferential removal of $H_2S$ over $NH_3$ in the regenerating tower, as in spite of the volatilization of ammonia by the air (or gas), ammonia remains in the solution unbound to $H_2S$, which ammonia is capable of removing a further quantity of $H_2S$ from the fuel gas, thus increasing the purification efficiency. A combined volatilization and regeneration is thereby effected in one step.

The invention further contemplates the addition of a small amount of soda ash to the recirculating solution, thereby considerably improving the removal of $H_2S$ and bringing the same up to 90% or more without any substantial detrimental effect upon the ammonia removal. The soda content of the solution may be kept at around 1% calculated as $Na_2CO_3$.

In addition to the general objects recited above, the invention includes among its objects such other improvements and advantages in construction and operation as are found to obtain in the procedure and apparatus hereinafter described or claimed.

In the accompanying drawings, forming a part of this specification, and showing, for purposes of exemplification, a preferred form and manner in which the invention may be embodied and practiced, but without limiting the claimed invention specifically to such illustrated instance or instances:

Figure 1:
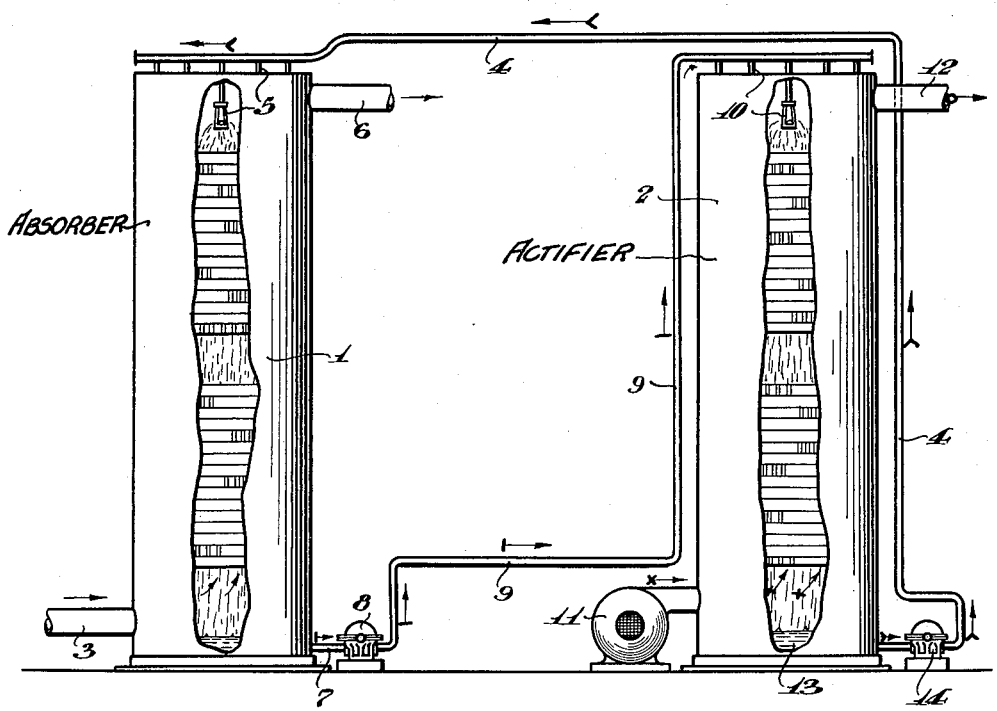
Figure 1 is a view in side elevation, partially in vertical section of a form of apparatus for carrying out the present invention.

In the embodiment illustrated in Figure 1, the apparatus, which may constitute a part of a by-product coke plant, includes a final cooler or absorber tower 1 and a secondary cooling tower or actifier 2. The relatively cool coke oven gas from the ovens and which preferably has bypassed the reheater and ammonia saturator but has passed through the tar batter or extractor and a primary cooler (not shown) enters the bottom of the tower 1 by means of pipe or conduit 3. The gas, containing a relatively high percentage of ammonia and hydrogen sulphide, which it is desired to remove, passes upwardly through the tower in contact with a descending stream of regenerated aqueous ammoniacal solution which is admitted to the top of the tower from pipe 4 and is distributed over the hurdles therein as by a plurality of spray nozzles 5. The liquid solution absorbs ammonia and hydrogen sulphide, free and combined, from the gas and the purified gas leaves the top of the tower 1 through conduit 6 and is preferably conducted to the oxide boxes (not shown) for further treatment therein or other desired collection or storage receptacle. The saturated ammoniacal solution is removed from the base of the tower at 7 and is conducted as by a pump 8 and conduit 9 to the top of the cooling tower 2 and is distributed therein by a plurality of spray nozzles 10. A blower 11 propels a stream of air upwardly through the tower 2 in contact with the descending saturate solution with the result that the latter is thoroughly aerated and the ammonia and hydrogen sulphide removed therefrom. These latter constituents are removed by the ascending air current at 12 and with such air are utilized for the purpose of supporting combustion at boilers or gas producers, or for the purpose of oven underfiring, all of such uses being well known and therefore are not illustrated. In this manner the impure air is effectually utilized and its discharge into the atmosphere, with consequent objectionable results, is avoided. The actified or regenerated aqueous ammoniacal solution 13 is removed from the bottom of the cooling tower 2 and is returned as by pump 14 and conduit line 4 to the top of the absorber tower 1 for further use in absorbing ammonia and hydrogen sulphide from the incoming coke oven gas at 3, thereby completing the cycle. The regenerated liquor returned to the final cooler 1 by means of pump 14, contains 1 to 5 grams per litre of free ammonia, while its hydrogen sulphide content amounts to only a few tenths of a gram per litre. The residual ammonia in the solution is thus free to absorb further quantities of hydrogen sulphide from the gas. The small amount of ammonia left in the purified gas may be utilized to material advantage in the oxide boxes (not shown).

A suitable and preferred rate of liquor circulation in the embodiment illustrated in Figure 1 is or may be 50 gallons of ammoniacal solution per each one thousand cubic feet of gas entering at 3.

In the above described embodiment and assuming there are 270 grains of H₂S per 100 cubic feet in the gas entering at 3, there is also about 350 to 400 grains of ammonia per 100 cubic feet. The gas leaving the primary absorber or final cooler at 6 contains about 80 grains of H₂S per 100 cubic feet, which is a removal of over 70%, and about 30 grains of ammonia per 100 cubic feet, which is practically a complete removal of the ammonia content.

Figure 2:
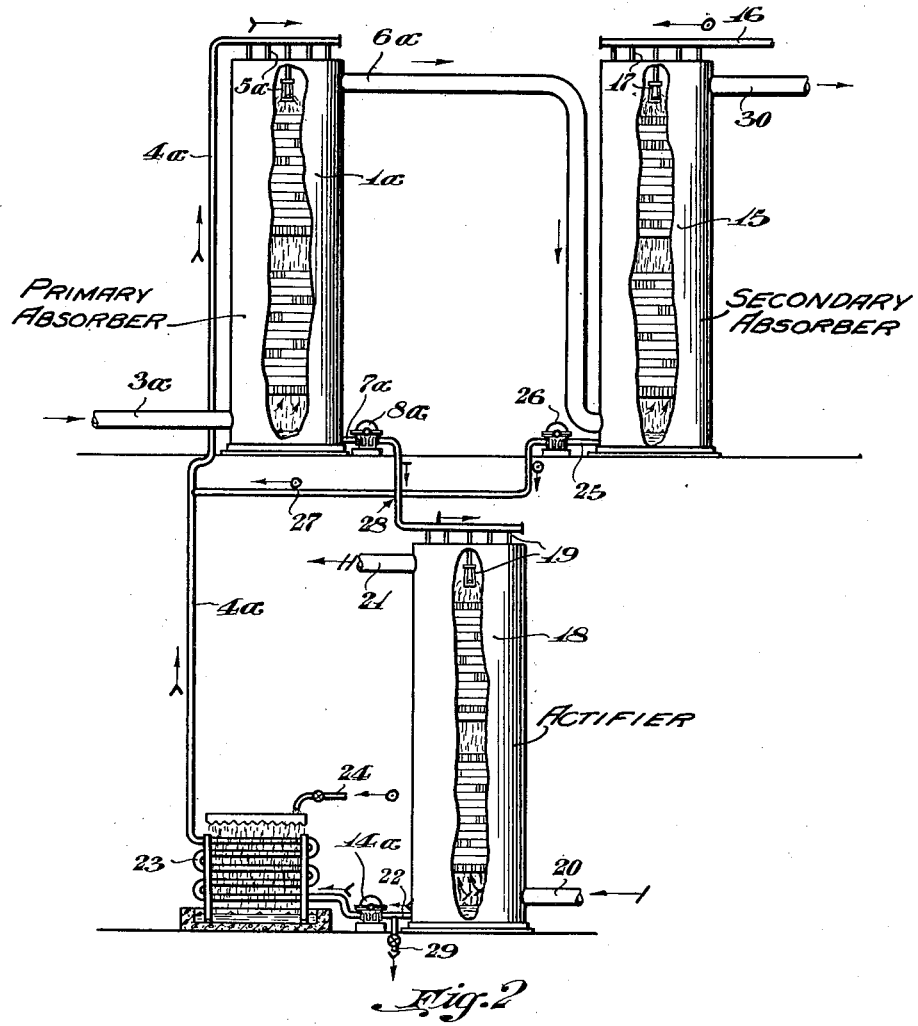
Figure 2 is a similar view showing a modified form of apparatus.

In the modified form of apparatus illustrated in Figure 2, the coke oven or other gas containing ammonia and hydrogen sulphide is introduced by conduit 3a into the final cooling tower or primary absorber 1a, while the gas from which most of these constituents have been removed, is taken off at 6a and conducted into the lower portion of a secondary absorber 15, ascends therein and is subjected to the further washing and scrubbing action of a descending stream or spray of fresh water admitted at 16 and distributed throughout the tower as by spray nozzles 17. The gas leaving the absorber 1a may contain from 20 to 40 grains of ammonia per 100 cubic feet which is removed in the secondary absorber 15. The completely washed and purified gas is taken off at 30 and disposed of in the manner described with reference to Figure 1. The regenerated aqueous solution for removing the ammonia and hydrogen sulphide in tower 1a is admitted from pipe 4a and nozzles 5a and the foul or saturated solution of ammoniacal liquor leaves the bottom of the tower at 7a and is conducted by pump 8a to the top of a scrubbing tower and producer gas cooler 18 and is distributed therein by means of nozzles 19 to form a descending stream or spray in contact with an upward flow of hot producer gas admitted at 20.

Any combustible or under-firing gas, such as producer gas, blast furnace gas or water gas may be admitted at 20 for the purpose of absorbing and removing the ammonia and hydrogen sulphide from the saturated liquor solution. Such hot gas admitted at 20 at a temperature of substantially 600° Fahr., is cooled in the tower 18 to a temperature of substantially 90° Fahr. at its point of removal 21. The cool gas containing the ammonia and hydrogen sulphide constituents may be thereafter burned under coke ovens or the like not shown), thereby effectually disposing of the ammonia and hydrogen sulphide contained in the gas. The regenerated ammoniacal liquor solution is removed at 22 from the bottom of the scrubbing tower 18 and is returned as by pump 14a and conduit 4a to the top of the primary absorber 1a. Preferably the regenerated solution is cooled between the scrubbing towers 18 and 1a as by means of a suitable cooling coil 23 over which cold water, admitted at 24, is distributed. The secondary solution of water from the bottom of the absorbing tower 15 is removed at 25 and may be conducted as by pump 26 and conduit 27 to the conduit 4a to mingle with the regenerated ammoniacal solution therein or such secondary water solution, containing a small portion of ammonia, may be mixed with the ammoniacal solution from tower 1a at the location indicated at 28, in which event the secondary solution is subjected to gas treatment in the scrubbing tower 18 prior to being returned to primary absorbing tower 1a. This provides a closed cycle for the primary washing fluids or solutions and in order to compensate for the added secondary stream of fresh water admitted at 16, and to balance the total volume of liquor in the system, a predetermined or desired amount of liquor may run to waste from the bottom of the regenerator or scrubbing tower 18, as indicated for exampde by the valve controlled pipe connection 29. In a by-product coke plant, in which producer gas is used for under-firing the coke oven, the coke oven gas is preferably passed through a primary cooler and tar extractor (not shown) prior to being admitted at 3a to the bottom of the absorbing tower 1a. For example, the gas entering at 3a may contain 180 grains of hydrogen sulphide per 100 cubic feet and 200 to 250 grains of ammonia per 100 cubic feet.

After treatment in the final cooler or primary absorber 1a the gas leaving at 6a may contain 80 grains of hydrogen sulphide and 20 to 40 grains of ammonia per each 100 cubic feet of gas. In passing through the secondary absorber 15 in contact with the fresh water admitted at 16 the ammonia content is still further reduced to 1 to 3 grains per 100 cubic feet while the hydrogen sulphide content is reduced to substantially 60 to 70 grains per 100 cubic feet at the gas outlet 30. The regenerated ammonia liquor leaves the bottom of the scrubbing tower or producer gas cooler 18 at a relatively high temperature and is thereafter cooled in the coil 23 to a temperature of from 60 to 70° Fahr. prior to being returned to the primary absorbing tower 1a.

The circulation of fresh water in the secondary system admitted at 16, for example may be 10 to 40% of the rate of circulation in the primary system admitted to the absorbing tower 1a and regenerated in the tower 18.

The ammonia liquor entering the primary absorber 1a contains about 1 to 5 grams per litre of free ammonia while its hydrogen sulphide content amounts to only a few tenths of a gram per litre. The ammonia in the solution is thus free to absorb further quantities of hydrogen sulphide from the gas.

The liquor condensed in the cooling towers may be treated and disposed of according to any of several methods. It may be discarded or distilled in an ammonia still (not shown) and the vapors added to the gas entering the primary absorber 1a. If desired these still vapors may be added through a pipe line (not shown) to the under-firing gas entering the heating flues of the oven, and which leaves the scrubbing tower 18 at 21.

A suitable rate of liquor circulation through the primary absorber 1a is or may be 50 gallons of solution per each 1000 cubic feet of gas.

Figure 3:
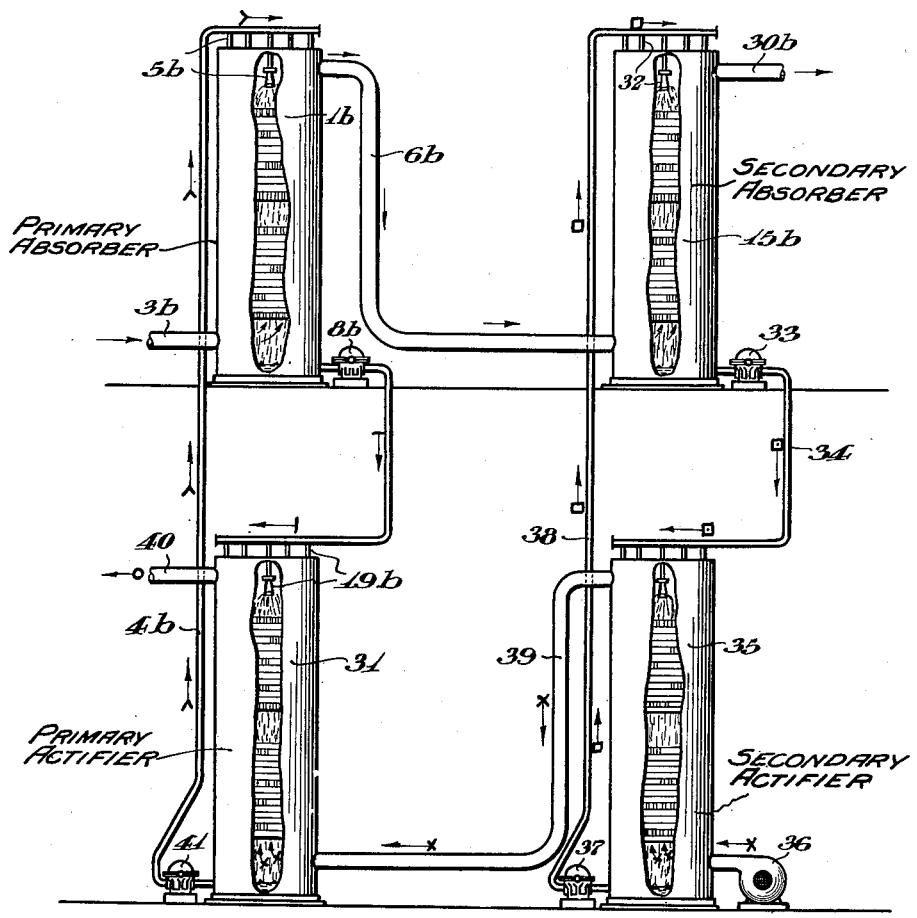
Figure 3 is a similar view showing a further modified form of apparatus.

Figure 3 illustrates a modified form of apparatus in which different means are provided for the actification of the foul washing solution containing ammonia and hydrogen sulphide. Air is employed as a regenerating medium for the foul solution. The gas to be purified, for example coke oven gas, enters the primary absorber 1b through conduit 3b. The partially purified gas from this tower is conducted by pipe 6b to the lower portion of a secondary scrubbing tower 15b which may be a Seaboard absorber. The completely purified gas substantially free of ammonia and hydrogen sulphide, is conducted from the upper part of the tower by pipe 39b and disposition of the same may be made as previously described. The regenerated ammoniacal solution for initially purifying the gas, and which is admitted at 5b to the top of the primary absorber 1b, takes up ammonia and hydrogen sulphide from the gas and is conducted from the bottom portion of said tower by means of pump 8b and is introduced by suitable spray nozzles 19b into the top of an actifying tower 31. The purifying solution admitted at 32 to the Seaboard absorber 15b and recirculated therein preferably is of approximately 2 to 3% alkalinity calculated as sodium carbonate ($Na_2CO_3$). This solution when partially saturated with ammonia and hydrogen sulphide from the gas to be purified, is conducted from the bottom of the tower 15b as by a pump 33 and pipe line 34 and is introduced into the top of a tower 35 which may be a Seaboard actifier. Air is introduced as by a blower 36 into the bottom of the actifier 35 and passing upwardly therein absorbs and removes the impurities from the alkaline liquor solution admitted into the top of said tower. The regenerated alkaline solution is conducted as by a pump 37 and pipe line 38 to the top of the Seaboard absorber 15b for recirculation therein. The air leaving the Seaboard actifier 35 through pipe 39 enters the lower portion of the foul ammonia liquor actifier 31 and is passed upwardly therein to remove ammonia and hydrogen sulphide from the spent liquor solution entering the top of this tower. The saturated air leaves the top of the actifier tower 31 and is conducted as by pipe 40 to the boilers, producers, or for over under-firing in the manner previously described, or this spent air which is saturated with the described ammonia and hydrogen sulphide constituents may be used at any desired location for combustion purposes. The volume of air introduced at 36 into the Seaboard actifier 35 is approximately three times the volume of gas treated. For example, assuming gas entering the Seaboard absorber 15b to contain about 75 grains of hydrogen sulphide per 100 cubic feet, and substantially all of this hydrogen sulphide is removed in the absorber, the air leaving the Seaboard actifier 35 at 39 contains only 25 grains of hydrogen sulphide per 100 cubic feet. This air is thus able to take up a considerable amount of hydrogen sulphide from the foul ammonia liquor solution in the actifier tower 31. The regenerated ammoniacal liquor solution from the bottom of actifier tower 31 is returned as by pump 41 and pipe line 4b to the top of the primary absorber tower 1b.

In this embodiment it will be noted that independent liquid purifying and recirculating systems are provided for the primary towers 1b and 31, and for the secondary towers 15b and 35.

Figure 4:
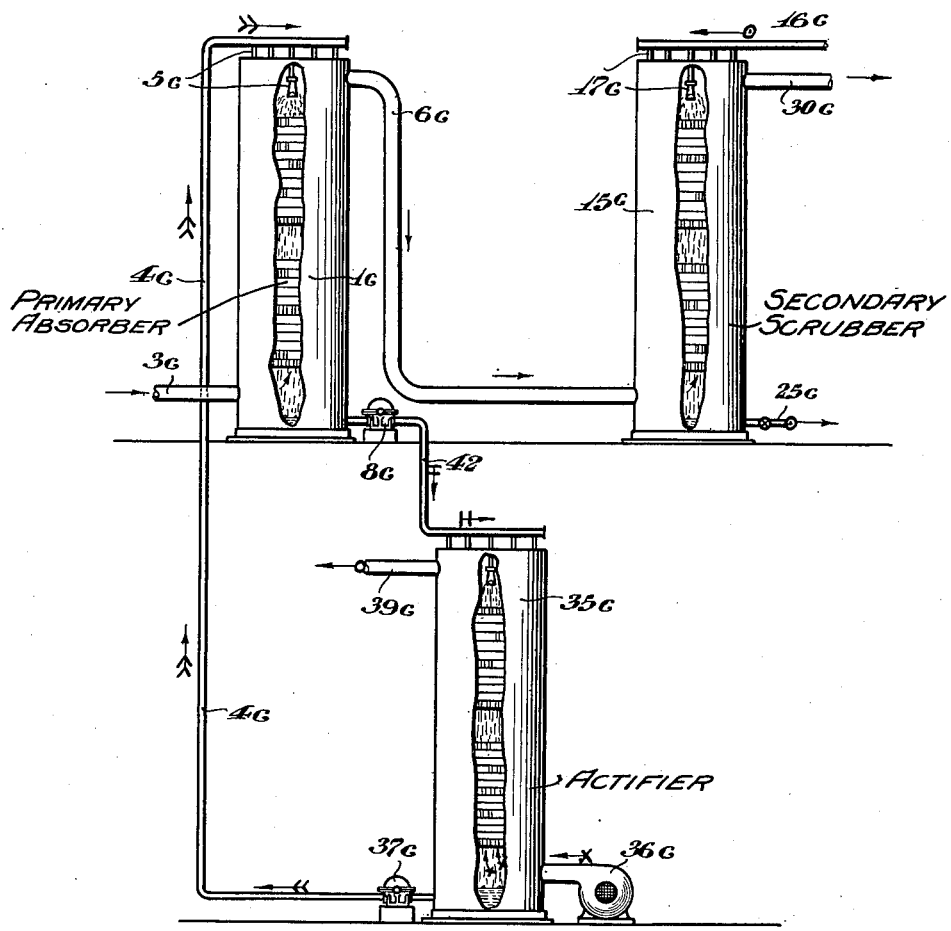
Figure 4 is a similar view showing a still further modified form of apparatus for carrying out the invention.

In the arrangement illustrated in Figure 4, the coke oven or other gas, containing ammonia and hydrogen sulphide, enters the absorber 1c at 3c. In this tower the gas is washed with an actified ammoniacal-soda-ash solution which is introduced at 5c into the top of the absorber tower. The substantially purified gas is conducted by pipe 6c to the bottom of the secondary scrubber tower 15c and ascends therein. In this tower the gas is subjected to a further scrubbing action by means of fresh water entering through pipe 16c and spray nozzle 17c, and any residual ammonia in the gas is removed. The completely purified gas, free of ammonia and hydrogen sulphide, leaves the top of the secondary scrubber through pipe conduit 30c and may be stored or disposed of as heretofore described. The foul fresh water solution containing the removed constituents, principally ammonia, is conducted from the bottom of the scrubber tower 15c through valve controlled pipe 25c and may be discarded as waste or utilized as above described in an ammonia still (not shown).

During its passage through primary absorber tower or final gas cooler 1c, the coke oven gas is subjected to the washing treatment of the downward stream or spray of soda-ash solution which is thereafter conducted as by pump 8c and pipe 42 into the top of an actifier tower 35c which is in all respects similar to the actifier tower 35 previously described in connection with Figure 3. In this tower the spent liquor is freed of the ammonia and hydrogen sulphide constituents by an upwardly directed air current introduced by the blower 36c. The foul air laden with impurities is removed from the top of the actifier by pipe 39c and utilized in under-firing or otherwise disposed of as heretofore described. The regenerated or actified amoniacal-soda-ash solution is recirculated and returned to the top of the primary absorbing tower 1c by means of pump 37c and pipe line 4c.

The amount of soda employed to furnish additional alkalinity above the ammonia present in the gas may be about 1% calculated as sodium carbonate ($Na_2CO_3$). In this manner substantially complete removal from the gas of all hydrogen sulphide and ammonia is obtained.

In all embodiments of the process where supplemental scrubbing of the gas with fresh water is employed, such additional scrubbing treatment is preferably used only where the beneficial effect of the residual ammonia in the oxide boxes is not desired. In other words, the supplemental or secondary treatment with fresh water may be employed to slightly modify the ammonia content of gas which is intended to pass to oxide boxes for further treatment, and where in the absence of such secondary treatment the ammonia content is too high for such additional purpose.

The invention is not limited to the foregoing embodiments described as exemplifying instances, but may be variously embodied and practiced within the scope of the claim hereinafter made.

What is claimed is:

The method of purifying fuel gas of ammonia and hydrogen sulphide which comprises: washing the gas with a regenerated ammoniacal solution of free or hydrated condition to remove both the hydrogen sulphide and ammonia therefrom, subjecting said initially purified gas to a second washing treatment with water to remove additional impurities therefrom, collecting said washed and purified gas, subjecting the spent ammoniacal solution to contact with hot fuel gas to carry off both the described impurities from said solution and simultaneously cooling said fuel gas while leaving some free ammonia in the solution, consuming in combustion the latter fuel gas containing both the said impurities from the ammoniacal solution, cooling the regenerated ammoniacal solution and recirculating the same for the primary washing of additional gas, conducting the spent second washing fluid to the circulating system of ammoniacal solution and balancing said system by drawing off predetermined quantites of said commingled washing fluids.

JOHN D. PRICE.